US009187578B2

(12) United States Patent
Kinoshita

(10) Patent No.: US 9,187,578 B2
(45) Date of Patent: *Nov. 17, 2015

(54) POLYMER MODIFIED PIGMENT AND PRODUCTION PROCESS OF THE SAME

(75) Inventor: Hiroshi Kinoshita, Chiba (JP)

(73) Assignee: DIC Corporation, Tokyo (JP)

(*) Notice: Subject to any disclaimer, the term of this patent is extended or adjusted under 35 U.S.C. 154(b) by 250 days.

This patent is subject to a terminal disclaimer.

(21) Appl. No.: 12/424,702

(22) Filed: Apr. 16, 2009

(65) Prior Publication Data

US 2010/0267894 A1  Oct. 21, 2010

(51) Int. Cl.
| | |
|---|---|
| C09D 11/10 | (2014.01) |
| C08F 2/44 | (2006.01) |
| C09C 1/30 | (2006.01) |
| C09C 1/36 | (2006.01) |
| C09C 3/10 | (2006.01) |

(52) U.S. Cl.
CPC .............. *C08F 2/44* (2013.01); *C09C 1/3072* (2013.01); *C09C 1/3676* (2013.01); *C09C 3/10* (2013.01); *C01P 2004/84* (2013.01)

(58) Field of Classification Search
CPC ................................................ C09B 67/0013
USPC ............................................................ 524/849
See application file for complete search history.

(56) References Cited

U.S. PATENT DOCUMENTS

| | | | | |
|---|---|---|---|---|
| 3,876,603 | A | * | 4/1975 | Makhlouf ................... 523/210 |
| 3,891,572 | A | * | 6/1975 | Moody et al. ........... 427/213.34 |
| 5,112,716 | A | * | 5/1992 | Kato et al. ................... 430/114 |
| 5,543,219 | A | | 8/1996 | Elwakil |
| 5,589,312 | A | * | 12/1996 | Horie et al. ................. 430/115 |
| 6,037,405 | A | * | 3/2000 | Iwase et al. ................. 524/596 |
| 6,184,267 | B1 | * | 2/2001 | Kato et al. ................... 523/160 |
| 6,262,152 | B1 | * | 7/2001 | Fryd et al. ..................... 524/90 |
| 7,199,177 | B2 | * | 4/2007 | Auschra et al. ............. 524/505 |
| 8,268,200 | B2 | * | 9/2012 | Kinoshita et al. ........... 252/586 |
| 8,399,541 | B2 | * | 3/2013 | Suwa et al. ................. 523/160 |
| 2003/0225188 | A1 | | 12/2003 | Horie |
| 2004/0006158 | A1 | | 1/2004 | Horie et al. |
| 2004/0006159 | A1 | | 1/2004 | Horie et al. |
| 2004/0116553 | A1 | | 6/2004 | Nakamura et al. |
| 2004/0143032 | A1 | * | 7/2004 | Auschra et al. ............. 523/160 |
| 2004/0229974 | A1 | | 11/2004 | Miyabayashi |
| 2005/0075416 | A1 | | 4/2005 | Miyabayashi |
| 2006/0098316 | A1 | * | 5/2006 | Tatsuzawa et al. .......... 359/891 |
| 2007/0155855 | A1 | | 7/2007 | Hees et al. |
| 2007/0259986 | A1 | * | 11/2007 | Elwakil et al. ................ 522/83 |
| 2008/0281036 | A1 | | 11/2008 | Ito et al. |
| 2009/0156730 | A1 | | 6/2009 | Cha et al. |
| 2010/0267894 | A1 | * | 10/2010 | Kinoshita ................... 524/849 |
| 2010/0308284 | A1 | * | 12/2010 | Kinoshita et al. ........... 252/586 |
| 2011/0015339 | A1 | * | 1/2011 | Kinoshita et al. ........... 524/556 |

FOREIGN PATENT DOCUMENTS

| | | |
|---|---|---|
| EP | 1270681 A2 | 1/2003 |
| EP | 1502935 A1 | 2/2005 |
| EP | 1832631 A1 | 9/2007 |
| JP | 58-141248 A | 8/1983 |
| JP | 61-040370 A | 2/1986 |
| JP | 64-040566 A | 2/1989 |
| JP | 06-016986 A | 1/1994 |
| JP | 06-016987 A | 1/1994 |
| JP | 06-148953 A | 5/1994 |
| JP | 07-331101 A | 12/1995 |
| JP | 10-260310 A | 9/1998 |
| JP | 10-316909 | 12/1998 |
| JP | 11-302553 A | 11/1999 |
| JP | 11-323238 A | 11/1999 |
| JP | 2000-351916 A | 12/2000 |
| JP | 2001-027827 A | 1/2001 |
| JP | 2001-066411 A | 3/2001 |
| JP | 2001-072887 | 3/2001 |
| JP | 2002-285028 A | 10/2002 |
| JP | 2002-309142 A | 10/2002 |
| JP | 2003-064293 A | 3/2003 |
| JP | 2003-206413 A | 7/2003 |
| JP | 2003-342514 A | 12/2003 |
| JP | 2004-002501 | 1/2004 |
| JP | 2004-018736 | 1/2004 |

(Continued)

OTHER PUBLICATIONS

Horie et al. English machine translation of JP 2004-107524. Obtained from JPO/AIPN website Mar. 15, 2011.*
English machine translation of JP 2008-088211 to Kinoshita et al. Obtained online from AIPN/JPO website on Mar. 5, 2015.*
International Search Report mailed Jun. 9, 2009, issued for PCT/JP2009/055583 and English translation thereof.
International Search Report mailed Jun. 9, 2009, issued for PCT/JP2009/055271 and English translation thereof.
International Search Report mailed Jul. 7, 2009, issued for PCT/JP2009/055584 and English translation thereof.
Office Action mailed Sep. 10, 2009, issued for the Japanese patent application No. 2009-529445 and English translation thereof.
Office Action mailed Jul. 28, 2011, issued for the Japanese patent application No. 2006-267283 and English translation thereof.
Office Action dated Oct. 13, 2011, issued for U.S. Appl. No. 12/734,567.
Office Action dated Jun. 25, 2012, issued for U.S. Appl. No. 12/922,901.

(Continued)

*Primary Examiner* — Michael Pepitone
*Assistant Examiner* — Michael A Salvitti
(74) *Attorney, Agent, or Firm* — Locke Lord LLP

(57) ABSTRACT

A polymer modified pigment having a polymer (P-1) on the surface of a pigment (A), wherein the polymer (P-1) is obtained by copolymerizing a copolymer (B-1) of a polymerizable unsaturated monomer containing at least one polymerizable unsaturated group soluble in a non-aqueous solvent, and at least one kind of polymerizable unsaturated monomer (C), which is soluble in the non-aqueous solvent and either insoluble or poorly soluble following polymerization: and a polymer modified pigment having a polymer (P-2) on the surface of a pigment (A), wherein the polymer (P-2) is obtained by polymerizing at least one kind of polymerizable unsaturated monomer (C) soluble in the non-aqueous solvent and either insoluble or poorly soluble following polymerization, in the presence of an alkyd resin (B-2) soluble in a non-aqueous solvent.

13 Claims, No Drawings

(56) References Cited

FOREIGN PATENT DOCUMENTS

| | | |
|---|---|---|
| JP | 2004-035592 | 2/2004 |
| JP | 2004-083660 | 3/2004 |
| JP | 2004-107523 | 4/2004 |
| JP | 2004-107524 | 4/2004 |
| JP | 2004-155818 | 6/2004 |
| JP | 2004-189928 | 7/2004 |
| JP | 2004-189929 | 7/2004 |
| JP | 2004-325893 A | 11/2004 |
| JP | 2005-097517 | 4/2005 |
| JP | 2005-120365 | 5/2005 |
| JP | 2006-022164 A | 1/2006 |
| JP | 2006-111752 A | 4/2006 |
| JP | 2007-002242 A | 1/2007 |
| JP | 2007-185883 A | 7/2007 |
| JP | 2007-527931 A | 10/2007 |
| JP | 2008-88211 * | 5/2008 |
| JP | 2008-111019 A | 5/2008 |
| WO | WO-2008/011963 A2 | 1/2008 |

OTHER PUBLICATIONS

Notice of Allowance mailed Oct. 2, 2012, issued for the Japanese patent application No. 2007-084451 and English translation thereof.
Notice of Allowance mailed Dec. 28, 2012, issued for U.S. Appl. No. 12/736,271.
Notice of Allowance mailed Mar. 21, 2013, issued for the Japanese patent application No. 2006-267283 and English translation thereof.
Search Report dated Jan. 20, 2014, issued for the European patent application No. 09724272.1.
Search Report dated Jan. 27, 2014, issued for the European patent application No. 09726089.7.

* cited by examiner

POLYMER MODIFIED PIGMENT AND PRODUCTION PROCESS OF THE SAME

BACKGROUND OF THE INVENTION

1. Field of the Invention

The present invention relates to a polymer modified pigment having a polymer on a pigment surface, and a production process of the same.

2. Description of the Related Art

Since pigments are typically insoluble colorants, the uniform dispersion of pigment particles in media such as solvents or resins is an important factor in the production of paint, printing ink or color filters and the like and in the coloring of plastics.

Since the dispersibility of a pigment is largely dependent on the surface properties of the pigment particles, efforts to improve dispersibility have been made using various surface treatments. Examples of these treatment methods include rosin treatment, treatment with various types of surfactants such as cationic surfactants, anionic surfactants or nonionic surfactants, pigment derivative treatment and polymer treatment.

Among these treatment methods, examples of polymer treatment methods, which are used to improve dispersibility by coating a polymer onto a pigment surface, include in-situ polymerization, phase separation (coacervation) and drying-in-liquid.

Among these, in-situ polymerization is a method that has been employed in the past, and is described in Patent Documents 1 to 7. All of these methods are carried out under aqueous conditions. For example, in the methods described in Japanese Unexamined Patent Application, First Publication No. 2004-189928 (Patent Document 1) and Japanese Unexamined Patent Application, First Publication No. 2004-189929 (Patent Document 2), a polymer modified pigment is obtained by stably dispersing a pigment in an aqueous medium using a surfactant or water-soluble polymer followed by polymerizing a monomer. In addition, in the methods described in Japanese Unexamined Patent Application, First Publication No. 2005-097517 (Patent Document 3) and Japanese Unexamined Patent Application, First Publication No. H10-316909 (Patent Document 4), a polymer modified pigment is obtained using a polymerizable surfactant. In addition, in the method described in Japanese Unexamined Patent Application, First Publication No. 2004-155818 (Patent Document 5), a polymer modified pigment is obtained by using an alkylene oxide chain-containing compound having a polymerizable functional group and polymerizing a monomer in a system in which a pigment is dispersed.

However, all of these methods had problems consisting the pigments able to be used being specified since the pigment is required to be in a state in which it can be stably dispersed in an aqueous medium, dispersion stability of the resulting polymer modified pigment being only able to be obtained in an aqueous medium, and dispersion stability being unable to be obtained in an organic solvent.

Although the method described in Japanese Unexamined Patent Application, First Publication No. H13-72887 (Patent Document 6) is a method for obtaining a polymer modified pigment by mixing a pigment and a monomer followed by suspension polymerization using a dispersion stabilizer, this method prevents the obtaining of fine polymer modified pigments.

In addition, the method described in Japanese Unexamined Patent Application, First Publication No. 2005-120365 is a method for obtaining a polymer modified pigment by polymerizing a monomer in the presence of a pigment of which the surface thereof has been precoated with a silane coupling agent in a mixed solvent consisting of a hydrophilic organic solvent and water. However, this method cannot be applied to organic pigments that are poorly miscible with silane coupling agents, that is, have poor affinity with silane coupling agents.

Examples of in-situ polymerization methods not using water for the solvent are described in Japanese Unexamined Patent Application, First Publication No. 2004-2501, Japanese Unexamined Patent Application, First Publication No. 2004-18736, Japanese Unexamined Patent Application, First Publication No. 2004-35592, Japanese Unexamined Patent Application, First Publication No. 2004-083660, Japanese Unexamined Patent Application, First Publication No. 2004-107523 and Japanese Unexamined Patent Application, First Publication No. 2004-107524 (Patent Documents 8 to 13). All of these methods consist of carrying out in-situ polymerization in a non-aqueous solvent having a dielectric constant of 1.5 to 20 and surface tension of 15 to 60 mN/m. However, since all of the methods described in these references require the use of a surface-modified pigment and that the pigment be stably dispersed with a specific dispersion stabilizer, they are not universal methods.

In this manner, although there are various techniques used to carry out in-situ polymerization, techniques have not obtained yet that can be applied to general-purpose pigments and allows the obtaining of a polymer modified pigment demonstrating satisfactory dispersion stability even in an organic solvent.

An object of the present invention is to provide a polymer modified pigment demonstrating satisfactory dispersion stability even in an organic solvent, and a process for producing a polymer modified pigment demonstrating satisfactory dispersion stability even in an organic solvent that can be applied to general-purpose pigments.

As a result of conducting extensive studies to solve the aforementioned problems, the inventors of the present invention found that a polymer modified pigment, having a polymer obtained by copolymerizing a specific polymer soluble in a non-aqueous solvent with at least one kind of polymerizable unsaturated monomer, demonstrates satisfactory pigment dispersibility, thereby leading to completion of the present invention.

SUMMARY OF THE INVENTION

The polymer modified pigment of the present invention can be obtained by so-called in-situ polymerization, comprising: mixing a pigment (A), a non-aqueous solvent and a copolymer (B-1) of a polymerizable unsaturated monomer containing at least one polymerizable unsaturated group, followed by copolymerizing the copolymer (B-1) of a polymerizable unsaturated monomer containing at least one polymerizable unsaturated group, and at least one kind of polymerizable unsaturated monomer (C) that is soluble in the non-aqueous solvent and either insoluble or poorly soluble following polymerization; or mixing the pigment (A), a non-aqueous solvent and an alkyd resin (B-2) followed by polymerizing in the mixture at least one kind of polymerizable unsaturated monomer (C) that is soluble in the non-aqueous solvent and either insoluble or poorly soluble following polymerization.

In the past, in-situ polymerization methods required a site for carrying out polymerization in which a pigment was finely and stably dispersed in a dispersion stabilizer. In the present invention, as a result of wetting the surface of the pigment (A) with the copolymer (B-1) of a polymerizable unsaturated monomer containing at least one polymerizable unsaturated group or the alkyd resin (B-2), the interface between the pigment (A), and the copolymer (B-1), or the alkyd resin (B-2) is thought to serve as the site of polymerization. A state where the pigment is finely and stably dispersed by a dispersion stabilizer is not required in the present invention. Therefore, surface treatment and the like of the pigment for forming a state in which the pigment is finely dispersed is not necessarily required, thereby enabling the present invention to be applied to a wide range of pigment types.

Namely, the present invention provides a polymer modified pigment having a polymer (P-1) on the surface of a pigment (A), wherein the polymer (P-1) is obtained by copolymerizing:

a copolymer (B-1) of a polymerizable unsaturated monomer containing at least one polymerizable unsaturated group soluble in a non-aqueous solvent, and at least one kind of polymerizable unsaturated monomer (C) which is soluble in the non-aqueous solvent and either insoluble or poorly soluble following polymerization.

In addition, the present invention provides a process for producing a polymer modified pigment as described above, comprising: mixing a pigment (A), a copolymer (B-1) of a polymerizable unsaturated monomer containing at least one polymerizable unsaturated group soluble in a non-aqueous solvent and a non-aqueous solvent, followed by copolymerizing in the a non-aqueous solvent, the copolymer (B-1) of a polymerizable unsaturated monomer containing at least one polymerizable unsaturated group, with at least one kind of polymerizable unsaturated monomer (C) which is soluble in the non-aqueous solvent and either insoluble or poorly soluble following polymerization.

In addition, the present invention provides a polymer modified pigment having a polymer (P-2) on the surface of a pigment (A), wherein the polymer (P-2) is obtained by polymerizing at least one kind of polymerizable unsaturated monomer (C) soluble in the non-aqueous solvent and either insoluble or poorly soluble following polymerization, in the presence of an alkyd resin (B-2) soluble in a non-aqueous solvent.

In addition, the present invention provides a process for producing a polymer modified pigment as described above, comprising: mixing a pigment (A), a non-aqueous solvent and an alkyd resin (B-2), followed by polymerizing at least one kind of polymerizable unsaturated monomer (C) which is soluble in the non-aqueous solvent but either insoluble or poorly soluble following polymerization.

DETAILED DESCRIPTION OF THE INVENTION

Since the polymer modified pigment of the present invention demonstrates satisfactory dispersion stability even in an organic solvent, it is extremely useful as a colorant of paints, plastics, printing ink, rubber, leather, textile printing, color filters, ink jet ink or thermal transfer ink and the like wherein an organic solvent is used as solvent.

In addition, the production process of the polymer modified pigment of the present invention can be applied to general-purpose pigments whether they are untreated pigment, treated pigment, organic pigment or inorganic pigment.

(Pigment (A))

The pigment (A) used in the present invention is at least one kind of pigment selected from among known, commonly used organic pigments or inorganic pigments. In addition, the present invention can be applied to untreated pigment or treated pigment.

Examples of organic pigments include perylene or perynone-based compound pigments, quinacridone-based compound pigments, phthalocyanine-based compound pigments, anthraquinone-based compound pigments, phthalone-based compound pigments, dioxazine-based compound pigments, isoindolinone-based compound pigments, methine or azomethine-based pigments, diketopyrrolopyrrole-based compound pigments, insoluble azo-based compound pigments, soluble azo-based compound pigments, and condensed azo-based compound pigments. The following lists specific examples of organic pigments.

Examples of perylene or perynone-based compound pigments include C.I. Pigment Violet 29, C.I. Pigment Red 123, 149, 178 and 179, C.I. Pigment Black 31 and 32, and C.I. Pigment Orange 43.

Examples of quinacridone-based compound pigments include C.I. Pigment Violet 19 and 42, C.I. Pigment Red 122, 202, 206, 207 and 209, and C.I. Pigment Orange 48 and 49.

Examples of phthalocyanine-based compound pigments include C.I. Blue 15, 15:1, 15:2, 15:3, 15:4, 15:6 and 16, and C.I. Pigment Green 7, 36 and 58.

Examples of anthraquinone-based compound pigments include C.I. Pigment Blue 60, C.I. Pigment Yellow 24 and 108, C.I. Pigment Red 168 and 177, and C.I. Pigment Orange 40.

Examples of phthalone-based compound pigments include C.I. Pigment Yellow 138.

Examples of dioxazine-based compound pigments include C.I. Pigment Violet 23 and 37.

Examples of isoindolinone-based compound pigments include C.I. Pigment Yellow 109, 110 and 173, and C.I. Pigment Orange 61.

Examples of methine and azomethine-based compound pigments include C.I. Pigment Yellow 139 and 185, C.I. Pigment Orange 66, and C.I. Pigment Brown 38.

Examples of diketopyrrolopyrrole-based compound pigments include C.I. Pigment red 254 and 255.

Examples of insoluble azo-based compound pigments include C.I. Pigment Yellow 1, 3, 12, 13, 14, 17, 55, 73, 74, 81, 83, 97, 130, 151, 152, 154, 156, 165, 166, 167, 170, 171, 172, 174, 175, 176, 180, 181 and 188, C.I. Pigment Orange 16, 36 and 60, C.I. Pigment Red 5, 22, 31, 112, 146, 150, 171, 175, 176, 183, 185, 208 and 213, C.I. Pigment Violet 43 and 44, and C.I. Pigment Blue 25 and 26.

Examples of soluble azo-based compound pigments include C.I. Pigment red 53:1, C.I. Pigment red 57:1, C.I. Pigment red 48.

Examples of condensed azo-based compound pigments include C.I. Pigment Yellow 93, 94, 95, 128 and 166, C.I. Pigment Orange 31, C.I. Pigment Red 144, 166, 214, 220, 221, 242, 248 and 262, and Pigment Brown 41 and 42.

Examples of inorganic pigments include titanium oxide, zinc sulfide, white lead, zincoxide, lithopone, antimony white, basic lead sulfate, basic lead silicate, barium sulfate, calcium carbonate, gypsum, silica, carbon black, graphite, cobalt violet, vermillion, molybdenum orange, lead tetraoxide, red iron oxide, chrome yellow, cadmium yellow, zinc chromate, yellow ochre, chromium oxide, ultramarine, Prussian blue and cobalt blue.

In the present invention, an organic pigment is preferably used since the effects of the present invention are demonstrated more effectively, and the aforementioned quinacridone-based compound pigments, phthalocyanine-based compound pigments, insoluble azo-based compound pigments and condensed azo-based compound pigments can be used particularly preferably.

(Non-Aqueous Solvent)

The non-aqueous solvent used in the present invention is an organic solvent that is required to be an aliphatic and/or alicyclic hydrocarbon-type solvent. Examples of aliphatic and/or alicyclic hydrocarbon-type solvents include n-hexane, n-heptane, "LAWS" and "Mineral Spirit EC" manufactured by Shell Chemicals, "Isopar C", "Isopar E", "Isopar G", "Isopar H", "Isopar L", "Isopar M", "Naphtha No. 3", "Naphtha No. 5" and "Naphtha No. 6" manufactured by Exxon Mobil Chemical, "Solvent No. 7", "IP Solvent 1016", "IP Solvent 1620", "IP Solvent 2028" and "IP Solvent 2835" manufactured by Idemitsu Petrochemical, "Whitesol" manufactured by Japan Energy Corporation, "Marukasol 8" manufactured by Maruzen Petrochemical Co., Ltd., and "AF Solvent No. 4", "AF Solvent No. 5", "AF Solvent No. 6" and "AF Solvent No. 7" manufactured by Nippon Oil Corporation.

In addition, other organic solvents may also be mixed with the non-aqueous solution, and be used within a range that does impair the effects of the present invention. Specific examples of such organic solvents include aromatic hydrocarbon-type solvents such as "Suwasol 100" or "Suwasol 150" manufactured by Maruzen Petrochemical Co., Ltd., toluene or xylene, esters such as methyl acetate, ethyl acetate, n-butyl acetate or amyl acetate, ketones such as acetone, methyl ethyl ketone, methyl isobutyl ketone, methyl amyl ketone or cyclohexanone, and alcohols such as methanol, ethanol, n-propanol, i-propanol or n-butanol.

When using by mixing, the amount of the aliphatic and/or alicyclic hydrocarbon-type solvent used is preferably 50% by mass or more and more preferably 60% by mass or more.

(Copolymer of Polymerizable Unsaturated Monomer Containing Polymerizable Unsaturated Group Soluble in Non-Aqueous Solvent) (B-1)

Specific examples of the copolymer (B-1) of a polymerizable unsaturated monomer containing at least one polymerizable unsaturated group, wherein the copolymer is soluble in a non-aqueous solvent and is usable in the present invention, include; a polymer in which a polymerizable unsaturated group has been introduced into a copolymer of a polymerizable unsaturated monomer having for a main component thereof an alkyl(meth)acrylate having an alkyl group having 4 or more carbon atoms; or a macromonomer which is a copolymer of a polymerizable unsaturated monomer having for a main component thereof an alkyl(meth)acrylate having an alkyl group having 4 or more carbon atoms.

Examples of alkyl(meth)acrylates having an alkyl group having 4 or more carbon atoms include n-butyl(meth)acrylate, i-butyl(meth)acrylate, t-butyl(meth)acrylate, 2-ethylhexyl(meth)acrylate, lauryl(meth)acrylate, stearyl(meth)acrylate, isostearyl(meth)acrylate and cyclohexyl(meth)acrylate.

In addition, examples of usable polymerizable unsaturated monomers other than an alkyl(meth)acrylates include aromatic vinyl monomers such as styrene, α-methylstyrene, p-t-butylstyrene or vinyl toluene, (meth)acrylates such as benzyl(meth)acrylate, dimethylamino(meth)acrylate, diethylamino(meth)acrylate, dibromopropyl(meth)acrylate or tribromophenyl(meth)acrylate, diesters of monovalent alcohols and unsaturated dicarboxylic acids such as maleic acid, fumaric acid or itaconic acid, and vinyl esters such as vinyl benzoate or "Veoba" (vinyl ester manufactured by Royal Dutch Shell). These monomers can be used by copolymerizing with the aforementioned alkyl(meth)acrylates.

A homopolymer of the usable polymerizable unsaturated group-containing monomer other than the alkyl(meth)acrylates has low solubility in the non-aqueous solvent. Accordingly, such a monomer is preferably used for a random polymer with an alkyl(meth)acrylate. In the case of carrying out block or graft polymerization using them, the solubility in the non-aqueous solvent decreases considerably, thereby making this not very preferable.

These polymerizable unsaturated monomers may be used alone or a plurality of types may be used in combination. In particular, the use of linear or branched alkyl(meth)acrylates having an alkyl group having 4 to 12 carbon atoms, such as n-butyl(meth)acrylate, 2-ethylhexyl(meth)acrylate or lauryl methacrylate is particularly preferable.

A copolymer of a polymerizable unsaturated monomer, wherein the copolymer includes as a main component an alkyl(meth)acrylate having an alkyl group having 4 or more carbon atoms, is obtained by polymerizing the polymerizable unsaturated monomer in accordance with ordinary methods.

The copolymer (B-1) of a polymerizable unsaturated monomer containing one or more polymerizable unsaturated groups is obtained by introducing a polymerizable unsaturated group into the copolymer of a polymerizable unsaturated monomer having as a main component thereof an alkyl(meth)acrylate having an alkyl group having 4 or more carbon atoms.

Examples of methods for introducing a polymerizable unsaturated group include: a method which comprises blending and copolymerizing in advance a carboxyl group-containing polymerizable monomer such as acrylic acid or methacrylic acid, and an amino group-containing polymerizable monomer such as dimethylaminoethyl methacrylate or dimethylaminopropyl acrylamide as copolymer components to obtain the copolymer having a carboxyl group and amino group, and then reacting the carboxyl group and the amino group of the copolymer with a monomer having a glycidyl group and a polymerizable unsaturated group such as glycidyl methacrylate;

a method which comprises blending and copolymerizing in advance hydroxyl group-containing monomers such as 2-hydroxyethyl methacrylate or 2-hydroxyethyl acrylate as copolymer components to obtain the copolymer having a hydroxyl group, and then reacting the hydroxyl group of the copolymer with a monomer having an isocyanate group and a polymerizable unsaturated group such as isocyanate ethyl methacrylate;

a method which comprises introducing a carboxyl group to a copolymer terminal end using thioglycolic acid as a chain transfer agent during polymerization, and then reacting a monomer having a glycidyl group and a polymerizable unsaturated group such as glycidyl methacrylate with the introduced carboxyl group of the copolymer; and a method which comprises introducing a carboxyl group into a copolymer using a carboxyl group-containing azo initiator such as azobis-cyanopentanoic acid as a polymerization initiator, and then reacting a monomer having a glycidyl group and a polymerizable unsaturated group such as glycidyl methacrylate with the introduced carboxyl group of the copolymer. In particular, a method in which a carboxyl group-containing monomer such as acrylic acid or methacrylic acid, or an amino group-containing monomer such as dimethylaminoethyl methacrylate or dimethylaminopropyl acrylamide, is copolymerized followed by reacting the carboxyl group or the amino group of the copolymer with a monomer having a glycidyl group and a polymerizable unsaturated group such as glycidyl methacrylate is the simplest and preferable.

(Alkyd Resin Soluble in Non-Aqueous Solvent (B-2))

The alkyd resin (B-2) soluble in non-aqueous solvent used in the present invention can be the result of modifying a condensation product of a polybasic acid and a polyvalent alcohol with a fatty oil or fatty acid. In addition, acrylic or other vinyl modification, phenol modification, epoxy ester modification and silicon modification and the like are also known as the resin. In the present invention, the use of an alkyd resin having a high oil length is preferable due to its high solubility in a non-aqueous solvent, and the use of a long oil alkyd resin is preferable. In addition, the use of an acrylic-modified alkyd resin is also preferable from the viewpoint of reactivity during polymerization of the polymerizable unsaturated monomer (C) to be described later. In the subsequent description, a long oil alkyd resin is abbreviated as alkyd resin (B-2-1), while an acrylic-modified alkyd resin is abbreviated as acrylic-modified alkyd resin (B-2-2).

(Alkyd Resin (B-2-1))

Specific examples of alkyd resin (B-2-1) include alkyd resins which can be obtained by reacting one of or a mixture of two or more types of polyvalent alcohols with one of or two or more types of carboxylic acids using one of or a mixture of two or more types selected from oils and/or fatty acids in accordance with ordinary methods. If necessary, one or more additional compounds can be used for substituting a portion of the polyvalent alcohols and/or the carboxylic acids. Examples of the oils and fatty acids include: saturated fatty acids such as octylic acid, lauric acid, stearic acid or "versatic acid" (synthetic fatty acid manufactured by Shell); unsaturated fatty acids such as oleic acid, linoleic acid, eleostearic acid or ricinoleic acid; (semi)-dry oils (fatty acids) such as "Pamolin 200 or 300" (synthetic dry oil fatty acid manufactured by Hercules USA), tung oil (fatty acid), linseed oil (fatty acid), dehydrated castor oil (fatty acid), tall oil (fatty acid), cottonseed oil (fatty acid), soybean oil (fatty acid), olive oil (fatty acid), safflower oil (fatty acid), castor oil (fatty acid) or rice bran oil (fatty acid); or hydrogenated coconut oil fatty acid, coconut oil fatty acid or palm oil fatty acid. Examples of the polyvalent alcohols include; ethylene glycol, propylene glycol, glycerin, trimethylolethane, trimethylolpropane, neopentyl glycol, 1,6-hexanediol, 1,2,6-hexanetriol, pentaerythritol or sorbitol. Examples of the carboxylic acid include; benzoic acid, p-t-butylbenzoic acid, phthalic acid(anhydride), hexahydrophthalic acid(anhydride), tetrahydrophthalic acid(anhydride), tetrachlorophthalic acid(anhydride), hexachlorophthalic acid(anhydride), tetrabromophthalic acid(anhydride), trimellitic acid, "hymic acid" (manufactured by Hitachi Chemical Co., Ltd.), succinic acid(anhydride), maleic acid(anhydride), fumaric acid, itaconic acid(anhydride), adipic acid, sebacic acid or oxalic acid. Examples of the additional compounds include: a reactive silicone resin such as "Toray Silicone SH-6018" (manufactured by Toray Silicone) or "X-22-160AS, KR-212 or KR-213" (manufactured by Shin-Etsu Chemical Co., Ltd.), a monoepoxy compound such as a glycidyl ester of a fatty acid such as "Cardura E" (glycidyl ester of the "versatic acid" described above manufactured by Shell); a polyepoxy compound such as "Epiclone 200 or 400" (manufactured by DIC Corporation) or "Epicoat 828 or 1001" (manufactured by Shell); diisocyanates such as tolylene diisocyanate, hexamethylene diisocyanate, isophorone diisocyanate or 4,4-methylenebis(cyclohexylisocyanate); polyisocyanates obtained by an addition reaction between these diisocyanates and the aforementioned polyvalent alcohols or water; and polyisocyanates having an isocyanuric ring obtained by (co)polymerization of diisocyanates.

(Acrylic-Modified Alkyd Resin (B-2-2))

The acrylic-modified resin (B-2-2) specifically refers to that obtained by polymerizing a polymerizable unsaturated monomer in the presence of the aforementioned alkyd resin (B-2-1), or that resulting from grafting an acrylic polymer by an addition reaction and the like to an alkyd resin. As the polymerizable unsaturated monomer which is used for polymerization that time, an alkyl(meth)acrylate having an alkyl group having 4 or more carbon atoms can be cited. Examples of which include n-butyl(meth)acrylate, i-butyl(meth)acrylate, t-butyl(meth)acrylate, 2-ethylhexyl(meth)acrylate, lauryl(meth)acrylate, stearyl(meth)acrylate, isostearyl meth (acrylate) and cyclohexyl(meth)acrylate, is particularly preferable due to the high solubility thereof in non-aqueous solvent. The polymerizable unsaturated monomer may be used alone, or a plurality of types may be used in combination. In particular, the use of a linear or branched alkyl(meth)acrylate having an alkyl group having 4 to 12 carbon atoms, such as n-butyl(meth)acrylate, 2-ethylhexylmeth(acrylate) or lauryl methacrylate, is particularly preferable.

In addition, within a range that does not impair solubility in non-aqueous solvent, an aromatic vinyl monomer such as styrene, x-methylstyrene, p-t-butylstyrene or vinyl toluene, (meth)acrylates such as benzyl(meth)acrylate, dimethylamino(meth)acrylate, diethylamino(meth)acrylate, dibromopropyl(meth)acrylate or tribromophenyl(meth)acrylate, a diester of a monovalent alcohol and an unsaturated dicarboxylic acid such as maleic acid, fumaric acid or itaconic acid, or vinyl esters such as vinyl benzoate or "Veoba" (vinyl ester manufactured by Royal Dutch Shell), can be suitably used by copolymerizing with the aforementioned alkyl(meth)acrylate.

In addition, as the acrylic resin which can be used for grafting to the alkyd resin (B-2-1), a copolymer of a polymerizable unsaturated monomer having for a main component thereof an alkyl(meth)acrylate having an alkyl group having 4 or more carbon atoms, obtained having as a main component thereof the aforementioned polymerizable unsaturated monomer, preferably used due to the high solubility in non-aqueous solvent.

(Polymerizable Unsaturated Monomer Soluble in Non-Aqueous Solvent and either Insoluble or Poorly Soluble Following Polymerization (C))

Specific examples of the polymerizable unsaturated monomer (C) soluble in the non-aqueous solvent and either insoluble or poorly soluble after polymerization used in the present invention include: vinyl monomers not having a so-called reactive polar group (functional group), such as methyl (meth)acrylate, ethyl(meth)acrylate, n-propyl(meth)acrylate or i-propyl methacrylate, or olefins such as (meth)acrylonitrile, styrene, ethylvinyl benzene, vinyl acetate, vinyl chloride, vinylidene chloride, vinyl fluoride or vinylidene fluoride; amide bond-containing vinyl monomers such as (meth) acrylamide, dimethyl(meth)acrylamide, N-t-butyl(meth) acrylamide, N-octyl(meth)acrylamide, diacetone acrylamide, dimethylaminopropyl acrylamide or alkoxylated N-methylolated(meth)acrylamides; dialkyl [(meth)acryloyloxyalkyl] phosphates, (meth)acryloyloxyalkyl acid phosphates, dialkyl [(meth)acryloyloxyalkyl] phosphites or (meth)acryloyloxyalkyl acid phosphites; phosphorous atom-containing vinyl monomers such as 3-chloro-2-acid phosphoxypropyl(meth)acrylate, alkylene oxide addition products of the aforementioned (meth)acryloyloxy alkyl acid phosphates or acid phosphites, and ester compounds of epoxy group-containing vinyl monomers such as glycidyl(meth) acrylate or methylglycidyl(meth)acrylate and phosphoric acid, phosphorous acid or acidic esters thereof; hydroxyl group-containing polymerizable unsaturated monomers such as hydroxyalkyl esters of polymerizable unsaturated carboxylic acids or their addition products with 6-caprolactone such as 2-hydroxyethyl(meth)acrylate, 2-hydroxypropyl (meth)acrylate, 3-hydroxypropyl(meth)acrylate, 2-hydroxybutyl(meth)acrylate, 3-hydroxybutyl(meth)acrylate, 4-hydroxybutyl(meth)acrylate, 3-chloro-2-hydroxypropyl(meth)acrylate, di-2-hydroxyethylfumarate or mono-2-hydroxyethyl monobutyl fumarate, or polypropylene glycol or polyethylene glycol mono(meth)acrylate, or "Praxel FM or FA Monomer" (caprolactone addition monomer manufactured by Daicel Chemical Industries), unsaturated mono- and/or dicarboxylic acids such as (meth)acrylic acid, crotonic acid, maleic acid, fumaric acid, itaconic acid or citraconic acid, polymerizable unsaturated carboxylic acids such as monoesters of these dicarboxylic acids and monovalent alcohols, various types of unsaturated carboxylic acids in the manner of addition products of the aforementioned polymerizable unsaturated carboxylic acid hydroxy alkyl esters and anhydrides of polycarboxylic acids such as maleic acid, succinic acid, phthalic acid, hexahydrophthalic acid, tetrahydrophthalic acid, benzene tricarboxylic acid, benzene tetracarboxylic acid, "hymic acid", tetrachlorophthalic acid or dodecinyl succinic acid, butylglycidyl esters or monoglycidyl esters of monovalent carboxylic acids such as "Cardura", coconut oil fatty acid glycidyl ester or octylic acid glycidyl ether, addition products of monoepoxy compounds and ethylene oxide or propylene oxide, or their addition products with ε-caprolactone or hydroxy vinyl ether; dialkylaminoalkyl(meth)acrylates such as dimethylaminoethyl(meth)acrylate or diethylaminoethyl(meth)acrylate; epoxy group-containing polymerizable unsaturated monomers such as epoxy group-containing polymerizable compounds obtained by addition reactions at an equimolar ratio of various polyepoxy compounds having at least two epoxy groups in a molecule thereof, such as "Epiclone 200", "Epiclone 400", "Epiclone 441", "Epiclone 850" or "Epiclone 1050" (epoxy resins manufactured by DIC Corporation), or "Epicoat 828", "Epicoat 1001" or "Epicoat 1004" (epoxy resins manufactured by Japan Epoxy Resins Co., Ltd.), "Araldite 6071" or "Araldite 6084" (epoxy resins manufactured by Ciba-Geigy, Switzerland) or additionally "Chissonox 221" (epoxy resin manufactured by Chisso Corporation) or "Denacol EX-611" (epoxy resin manufactured by Nagase & Co., Ltd.), with various types of unsaturated carboxylic acids such as equimolar addition products of the aforementioned polycarboxylic acid anhydrides and hydroxyl group-containing vinyl monomers such as glycidyl meth(acrylate), (β-methyl)glycidyl (meth)acrylate, (meth)allyl glycidyl ether or polymerizable unsaturated carboxylic acids or mono-2-(meth)acryloyloxy monoethyl phthalate; isocyanate group-containing α,β-ethylenic unsaturated monomers such as 2-hydroxyethyl(meth)acrylate-hexamethylene diisocyanate equimolar addition products or monomers having an isocyanate group and vinyl group such as isocyanate ethyl(meth)acrylate; alkoxysilyl group-containing polymerizable unsaturated monomers such as silicon-based monomers such as vinyl ethoxysilane, α-methacryloxypropyl trimethoxysilane, trimethylsiloxyethyl(meth)acrylate or "KR-215, X-22-5002" (manufactured by Shin-Etsu Chemical Co., Ltd.); and, carboxyl group-containing α,β-ethylenic unsaturated monomers such as addition products of α,β-ethylenic unsaturated carboxylic acids such as monoesters of dicarboxylic acids and monovalent alcohols, unsaturated mono- or dicarboxylic acids such as (meth)acrylic acid, crotonic acid, maleic acid, fumaric acid, itaconic acid or citraconic acid, or addition products of α,β-unsaturated carboxylic acid hydroxyalkyl esters such as 2-hydroxyethyl(meth)acrylate, 2-hydroxypropyl(meth)acrylate, 3-hydroxypropyl(meth)acrylate, 2-hydroxybutyl(meth)acrylate, 3-hydroxybutyl(meth)acrylate, 4-hydroxybutyl(meth)acrylate, 3-chloro-2-hydroxypropyl(meth)acrylate, di-2-hydroxyethyl fumarate, mono-2-hydroxyethyl-monobutyl fumarate or polyethylene glycol mono(meth)acrylate, and anhydrides of polycarboxylic acids such as maleic acid, succinic acid, phthalic acid, hexahydrophthalic acid, tetrahydrophthalic acid, benzene tricarboxylic acid, benzene tetracarboxylic acid, "hymic acid", tetrachlorophthalic acid or dodecinyl succinic acid.

In particular, the use of alkyl(meth)acrylates having 3 or less carbon atoms, such as methyl(meth)acrylate or ethyl (meth)acrylate is preferable. Moreover, copolymerization using a polymerizable unsaturated monomer containing at least one kind of functional group such as a carboxyl group, sulfonate group, phosphate group, hydroxyl group or dimethylamino group is preferable for changing the surface properties of the pigment surface and enhancing interaction with a pigment dispersant or pigment-dispersing resin.

In addition, a general-purpose monomer other than the polymerizable unsaturated monomer (C) may be used in combination therewith within a range that does not impair the effects of the present invention. Examples of such monomers include the previously described alkyl(meth)acrylates having an alkyl group having 4 or more carbon atoms, and polymerizable unsaturated monomers able to be used other than the aforementioned alkyl(meth)acrylates.

In addition, the containing of a partially crosslinkable monomer such as a polyfunctional polymerizable unsaturated monomer as a portion of the polymerizable unsaturated monomer (C) is even more preferable for preventing elution of the pigment from the modified polymer. Examples of polyfunctional polymerizable unsaturated monomers include divinyl benzene, ethylene glycol di(meth)acrylate, diethylene glycol di(meth)acrylate, triethylene glycol di(meth)acrylate, polyethylene glycol di(meth)acrylate, 1,3-butanediol di(meth)acrylate, 1,4-butanediol di(meth)acrylate, 1,6-hexanediol di(meth)acrylate, neopentyl glycol dimethacrylate, trimethylolpropane triethoxy tri(meth)acrylate, trimethylolpropane tri(meth)acrylate, pentaerythritol tri(meth)acrylate, pentaerythritol tetra(meth)acrylate, dipentaerythritol hexa (meth)acrylate and allyl methacrylate.

Among the polymer modified pigments of the present invention:

the polymer modified pigment having, on the surface of the pigment (A), the polymer (P-1) obtained by copolymerizing the copolymer (B-1) of a polymerizable unsaturated monomer containing at least one polymerizable unsaturated group soluble in a non-aqueous solvent, and at least one kind of the polymerizable unsaturated monomer (C) soluble in the non-aqueous solvent and either insoluble or poorly soluble following polymerization, is obtained by the method which comprises; mixing a non-aqueous solvent, the pigment (A), and the copolymer (B-1) of a polymerizable unsaturated monomer containing at least one polymerizable unsaturated group, and copolymerizing the copolymer (B-1) of a polymerizable unsaturated monomer containing at least one polymerizable unsaturated group, and at least one kind of the polymerizable unsaturated monomer (C) that is soluble in the non-aqueous solvent and either soluble or poorly soluble following polymerization in the non-aqueous solvent.

In addition, the polymer modified pigment having, on the surface of the pigment (A), the polymer (P-2), in which the alkyd resin (B-2) soluble in a non-aqueous solvent is copolymerized with at least one kind of the polymerizable unsaturated monomer (C) soluble in the non-aqueous solvent and either insoluble or poorly soluble following polymerization, is obtained by mixing the pigment (A), the non-aqueous solvent and the alkyd resin (B-2), followed by copolymerizing with at least one kind of the polymerizable unsaturated monomer (C) that is soluble in the non-aqueous solvent and either insoluble or poorly soluble following polymerization.

The pigment (A) is preferably mixed with the copolymer (B-1) of a polymerizable unsaturated monomer containing at least one polymerizable unsaturated group or the alkyd resin (B-2) prior to carrying out polymerization. Examples of mixing methods that can be used include the use of a homogenizer, disperser, beadmill, paint shaker, kneader, rollmill, ballmill, attriter or sand mill. In the present invention, the form of the pigment used may be of any form, such as a slurry, wet cake or powder. Namely, in the production process of the present invention, a pigment containing water in the manner of a wet cake can also be used as a pigment.

A polymer modified pigment can be obtained by mixing the pigment (A), the copolymer (B-1) of a polymerizable unsaturated monomer containing at least one polymerizable unsaturated group or the alkyd resin (B-2), followed by further mixing the polymerizable unsaturated monomer (C) and a polymerization initiator to be described later, and carrying out polymerization.

At that time, although the amount of the copolymer (B-1) of a polymerizable unsaturated monomer containing at least one polymerizable unsaturated group or the alkyd resin (B-2) used is suitably optimized corresponding to the purpose and there are no particular limitations thereon, the amount used is normally 1 to 200 parts, preferably 5 to 50 parts and more preferably 5 to 30 parts based on 100 parts of the pigment (A)

In addition, although the amount of the polymerizable unsaturated monomer (C) used is also suitably optimized corresponding to the purpose and there are no particular limitations thereon, the amount used is normally 1 to 200 parts, preferably 5 to 50 parts and more preferably 5 to 30 parts based on 100 parts of the pigment (A).

The amount of the copolymer (B-1) containing at least one polymerizable unsaturated group or the alkyd resin (B-2) finally coated onto the pigment is preferably 2 to 400 parts, more preferably 10 to 100 parts and even more preferably 10 to 60 parts based on 100 parts of the pigment (A) At that time, at least one kind of the polymerizable unsaturated monomer (C) is preferably used at a ratio of 10 to 400 parts, preferably 30 to 400 parts and more preferably 50 to 200 parts to 100 parts of the polymer (B-1) or (B-2).

Although the method for polymerizing the polymerizable unsaturated monomer (C) after mixing the pigment (A), a non-aqueous solvent, and the copolymer (B-1) of a polymerizable unsaturated monomer containing at least one polymerizable unsaturated group, or after mixing the pigment (A) and the non-aqueous solvent and the alkyd resin (B-2), may be carried out according to a known, commonly used polymerization method, it is normally carried out in the presence of a polymerization initiator. This polymerization initiator is used singly or the combined use of two or more types of a radical-generating polymerization catalyst such as azobis(isobutyronitrile) (AIBN), 2,2-azobis(2-methylbutyronitrile), benzoyl peroxide, t-butyl benzoate, t-butyl-2-ethylhexanoate, t-butyl hydroperoxide, di-t-butyl peroxide or cumene hydroperoxide.

Since some polymerization initiators are difficult to dissolve in the non-aqueous solvent system, a method is preferably used in which the polymerization initiator is dissolved in the polymerizable unsaturated monomer (C) and then added to a mixture of the pigment (A), a non-aqueous solvent and the copolymer (B-1) of a polymerizable unsaturated monomer containing at least one polymerizable unsaturated group, or to a mixture of the pigment (A), the non-aqueous solvent and the alkyd resin (B-2).

In addition, although the polymerizable unsaturated monomer (C) or the polymerizable unsaturated monomer (C) in which a polymerization initiator has been dissolved can be added by dropping in a state that the mixture has reached the polymerization temperature, a method in which it is added to the mixture at normal temperature prior to heating and then they are heated and polymerized after having been adequately mixed results in greater stability and is therefore preferable.

The polymerization temperature is normally within the range of 60 to 130° C. In addition, since there are cases in which the pigment (A) may undergo a change in state such as deterioration or crystal growth if the polymerization temperature is excessively high when the pigment (A) is an organic pigment, polymerization is preferably carried out at 70 to 100° C. in such cases.

Following polymerization, the polymer modified pigment can be obtained in the form of a powder by removing the non-aqueous solvent and the like used for polymerization by filtering followed by drying and crushing. A Nutsche or filter press and the like can be used for the filtering method. In addition, drying can be carried out with a known drying apparatus such as a box dryer, vacuum dryer, band dryer or spray dryer. In addition, a known crushing apparatus such as a mortar, hammer mill, disk mill, pin mill or jet mill can be used for crushing.

EXAMPLES

The following provides an explanation of the present invention through examples thereof. Unless specifically indicated otherwise, the terms "parts" and "%" are based on mass.

Reference Example 1

Synthesis of Copolymer (B-1-1) Containing Polymerizable Unsaturated Groups Soluble in Non-Aqueous Solvent When 800 parts of heptane and 170 parts of butyl acetate were placed in a four-neck flask provided with a thermometer, stirrer, reflux condenser and nitrogen gas inlet tube followed by heating to 90° C., and then, when temperature was reached 90° C., a mixture composed of 985 parts of butyl acrylate, 15 parts of methacrylic acid and 7 parts of 2,2'-azobis(2-methylbutyronitrile) were dropped in over 5 hours followed by continuing the reaction while holding at the same temperature for 10 hours following completion of dropping.

After lowering the temperature of the reaction liquid to 50° C., a solution containing 0.2 parts of b-butylpyrocatechol dissolved in 15 parts of butyl acetate was added followed by the addition of 15 parts of glycidyl methacrylate and 30 parts of dimethylaminoethanol. Then, the mixture was heated to 80° C. and reacted for 10 hours at that temperature to obtain a solution of the copolymer (B-1-1) containing a polymerizable unsaturated group soluble in non-aqueous solvent. The blending ratios are shown in Table 1.

Reference Examples 2 to 7

Synthesis of Copolymers (B-1-2) to (B-1-7) Containing a Polymerizable Unsaturated Group Soluble in Non-Aqueous Solvent Polymerizable unsaturated group(s)-containing copolymers (B-1-2) to (B-1-7) were obtained according to the same method as Reference Example 1 with the exception of using the blending ratios shown in Table 1.

TABLE 1

Table 1 Blending Ratios of Reference Examples

|  | Ref. Ex. 1 | Ref. Ex. 2 | Ref. Ex. 3 | Ref. Ex. 4 | Ref. Ex. 5 | Ref. Ex. 6 | Ref. Ex. 7 |
|---|---|---|---|---|---|---|---|
| Copolymer (B-1) | Copolymer (B-1-1) | Copolymer (B-1-2) | Copolymer (B-1-3) | Copolymer (B-1-4) | Copolymer (B-1-5) | Copolymer (B-1-6) | Copolymer (B-1-7) |
| Butyl-Ac | 985 |  | 700 | 800 | 500 |  | 280 |
| Butyl-MAc |  |  | 100 |  |  | 600 |  |
| 2-ethylhexyl-MAc |  | 950 |  |  | 480 |  | 700 |
| Isostearyl-MAc |  |  |  |  |  | 380 |  |
| Benzyl-MAc |  |  |  | 100 |  |  |  |
| Methacrylic acid | 15 |  |  |  |  | 20 |  |
| Acrylic acid |  |  |  |  | 20 |  | 20 |
| Dimethyl-aminoethyl-MAc |  | 50 | 200 | 100 |  |  |  |
| Polymerization initiator 1 | 7 | 7 | 10 |  | 10 |  | 10 |
| Polymerization initiator 2 |  |  |  | 10 |  | 10 |  |
| Heptane | 800 | 950 | 950 | 700 | 920 |  |  |
| Isopar C |  |  |  |  |  | 870 | 970 |
| Butyl acetate | 170 | 50 | 50 | 300 | 50 | 100 |  |
| Glycidyl-MAc | 15 | 15 | 20 | 20 | 15 | 15 | 15 |
| t-butyl-pyrocatechol | 0.2 | 0.2 | 0.3 | 0.2 | 0.2 | 0.3 | 0.2 |
| Dimethylamino-ethanol | 30 |  |  |  | 30 | 30 | 30 |
| Butyl acetate | 15 | 15 | 20 | 20 | 15 | 15 | 15 |
| Non-volatile matter (%) | 50 | 50 | 50 | 50 | 50 | 50 | 50 |

The following abbreviations are used in Table 1.
Polymerization initiator 1: 2,2'-azobis(2-methylbutyronitrile)
Polymerization initiator 2: t-butylperoxy-2-ethylbenzoate
-Ac: acrylate
-MAc: methacrylate Reference Example 8

Synthesis of Alkyd Resin (B-2-1-1)

650 parts of soybean oil, 137 parts of pentaerythritol and 0.15 parts of lithium hydroxide were placed in a four-neck flask provided with a thermometer, stirrer, decanter and nitrogen gas inlet tube followed by heating to 250° C. After carrying out transesterification by maintaining at the same temperature for 1 hour, the temperature was lowered to 200° C. followed by the addition of 240 parts of phthalic anhydride and 30 parts of xylene and heating to 240° C. After reacting for about 5 hours until the acid value reached 6 while refluxing the xylene and dehydrating at the same temperature, the product was diluted with "LAWS" (mixed aliphatic hydrocarbon solvent and aromatic hydrocarbon solvent having a ratio of 70/30 manufactured by Shell Chemicals) to a non-volatile matter content of 60% to obtain an alkyd resin (B-2-1-1) having a long oil length of 65%.

Reference Example 9

Synthesis of Acrylic-Modified Alkyd Resin (B-2-2-1)

A a reaction solvent composed of 750 parts of heptane and 100 parts of butyl acetate were placed in a four-neck flask provided with a thermometer, stirrer, reflux condenser and nitrogen gas inlet tube followed by heating to 90° C. When temperature was reached to 90° C., a reaction mixture composed of 600 parts of butyl acrylate, 250 parts of isostearyl methacrylate, 250 parts of the alkyd resin (B-2-2-1) obtained in Reference Example 8, 10 parts of 2,2'-azobis(2-methylbutyronitrile) and 50 parts of butyl acetate was dropped in over 5 hours. Following completion of dropping, the reaction was continued by maintaining at the same temperature for 10 hours to obtain a solution of acrylic-modified alkyd resin (B-2-2-1). The blending ratios are shown in Table 1.

Reference Examples 10 to 12

Synthesis of Acrylic-Modified Alkyd Resins

Acrylic-modified alkyd resins (B-2-2-2) to (B-2-2-4) were obtained according to the same method as Reference Example 9 with the exception of using the blending ratios shown in Table 2.

TABLE 2

Table 2 Blending Ratios of Reference Examples

|  |  |  | Ref. Ex. 9 | Ref. Ex. 10 | Ref. Ex. 11 | Ref. Ex. 12 |
|---|---|---|---|---|---|---|
| Acrylic-modified Alkyd Resin (B-2-2) |  |  | (B-2-2-1) | (B-2-2-2) | (B-2-2-3) | (B-2-2-4) |
| Reaction solvent |  | Heptane | 750 | 580 |  |  |
|  |  | Isopar C |  |  | 578 | 717 |
|  |  | Butyl acetate | 100 | 50 |  | 100 |
| Reaction Mixture | Polymerizable unsaturated monomer | Butyl acrylate | 600 | 350 |  |  |
|  |  | Butyl methacrylate |  |  |  | 750 |
|  |  | 2-ethylhexyl methacrylate |  |  | 550 |  |

TABLE 2-continued

Table 2 Blending Ratios of Reference Examples

|  |  | Ref. Ex. 9 | Ref. Ex. 10 | Ref. Ex. 11 | Ref. Ex. 12 |
|---|---|---|---|---|---|
|  | Isostearyl methacrylate | 250 |  |  |  |
|  | Dimethylamino-ethyl methacrylate |  |  |  | 50 |
| Solvent | Isopar C |  |  | 200 |  |
|  | Butyl acetate | 50 | 50 |  | 50 |
| Alkyd resin | Alkyd resin obtained in Reference Example 8 (B-2-2-1) | 250 |  |  |  |
|  | Beckosol P-470-67B |  | 970 | 672 |  |
|  | Super Beckosol J-537 |  |  |  | 333 |
| Polymerization initiator | 2,2'-azobis (2-methyl-butyronitrile) | 10 |  | 10 |  |
|  | t-butylperoxy-2-ethyl-hexanoate |  | 10 |  | 10 |
| Non-volatile matter (%) |  | 50 | 50 | 50 | 50 |

The following abbreviations are used in Table 2.
Beckosol P-470-67B: Soybean oil-based alkyd resin manufactured by DIC Corporation., non-volatile matter content: 67%,
solvent: "LAWS" (Shell Chemicals)
Super Beckosol J-537: Safflower oil-based alkyd resin manufactured by DIC Corporation, non-volatile matter content: 60%,
solvent: "LAWS" (Shell Chemicals)

Comparative Reference Example 1

800 parts of butyl acetate were placed in a four-neck flask provided with a thermometer, stirrer, reflux condenser and nitrogen gas inlet tube followed by heating to 90° C. When temperature was reached to 90° C., a mixture composed of 500 parts of 2-ethylhexyl methacrylate, 500 parts of Macromonomer AS-6 (polystyrene macromonomer manufactured by Toagosei Co., Ltd., molecular weight: 6000), 200 parts of butyl acetate and 10 parts of 2,2'-azobis(2-methylbutyronitrile) was dropped in over 5 hours. Following completion of dropping, the reaction was continued while maintaining at the same temperature for 12 hours to obtain a poly(2-ethylhexylmethacrylate)-polystyrene grafted copolymer.

Comparative Reference Example 2

900 parts of heptane and 100 parts of butyl acetate were placed in a four-neck flask provided with a thermometer, stirrer, reflux condenser and nitrogen gas inlet tube followed by heating to 90° C. When temperature was reached to 90° C., a mixture composed of 1000 parts of butyl acrylate and 10 parts of 2,2'-azobis(2-methylbutyronitrile) was dropped in over 5 hours. Following completion of dropping, the reaction was continued while maintaining at that temperature for 10 hours to obtain a homopolymer of butyl acrylate.

Example 1

Synthesis of Polymer Modified Pigment (1)

208 parts of a wet cake (pigment content: 48%) of Fastogen Blue FGF (blue pigment manufactured by DIC Corporation), 20 parts of the copolymer (B-1-1) obtained in Reference Example 1, 600 parts of 1.25 mm zirconia beads and 300 parts of heptane were placed in a polyethylene wide-mouthed bottle followed by mixing for 60 minutes with a paint shaker (Toyo Seiki Co., Ltd.). After diluting with 200 parts of heptane, the zirconia beads were removed to prepare a pigment mixture.

After placing 400 parts of the resulting pigment mixture in a separable flask provided with a thermometer, stirrer, reflux condenser and nitrogen gas inlet tube, a solution, in which 1.6 parts of t-butylacrylamide sulfonic acid as the polymerizable monomer is dissolved in 20 parts of ion exchange water, was added to the mixture. Furthermore, 200 parts of heptane and a solution of 2 parts of 2,2'-azobis(2-methylbutyronitrile) dissolved in a polymerizable monomer composition consisting of 5 parts of methyl methacrylate and 5 parts of ethylene glycol dimethacrylate were added to the mixture. After continuing to stir for 30 minutes at room temperature, the temperature thereof was raised to 80° C. and the reaction was continued for 15 hours at that temperature. After cooling, filtration was carried out to separate the polymer modified pigment and polymerization solvent. The resulting polymer pigment was dried for 5 hours at 100° C. with a hot air dryer followed by crushing with a crusher to obtain a polymer modified pigment (1).

Examples 2 to 21

Synthesis of Polymer Modified Pigments (2) to (21)

Pigment mixtures were prepared in the same manner as Example 1 with the exception of changing the types and amounts of the pigment (A), copolymer (B-1) or alkyd resin (B-2) and non-aqueous solvent used to those shown in Tables 3 to 6.

Polymer modified pigments (2) to (21) were then obtained in the same manner as Example 1 with the exception of using 400 parts of the resulting pigment mixtures and changing the polymerizable monomer (C) to the polymerizable monomers shown in Tables 3 to 6.

TABLE 3

Table 3

|  |  |  | Ex. 1 | Ex. 2 | Ex. 3 | Ex. 4 | Ex. 5 | Ex. 6 |
|---|---|---|---|---|---|---|---|---|
| Polymer modified pigment (PM pigment) |  |  | PM pigment (1) | PM pigment (2) | PM pigment (3) | PM pigment (4) | PM pigment (5) | PM pigment (6) |
| Pigment mixture | Copolymer (B-1) | Type | (B-1-1) | (B-1-1) | (B-1-2) | (B-1-2) | (B-1-3) | AB-6 |
|  |  | Amt. used | 20 | 40 | 40 | 40 | 30 | 30 |

TABLE 3-continued

|  |  |  | Ex. 1 | Ex. 2 | Ex. 3 | Ex. 4 | Ex. 5 | Ex. 6 |
|---|---|---|---|---|---|---|---|---|
|  | Non-aqueous solvent during dispersion | Heptane | 300 | 300 | 400 | 400 | 400 | 400 |
|  | Pigment (A) | Type | Pigment 1 | Pigment 1 | Pigment 2 | Pigment 3 | Pigment 3 | Pigment 1 |
|  |  | Amt. used | 208 | 208 | 100 | 100 | 100 | 208 |
|  | 1.25 mm zirconia beads |  | 600 | 600 | 600 | 600 | 600 | 600 |
|  | Non-aqueous solvent added before removal of the beads | Heptane Isopar C | 200 | 200 | 200 | 200 | 200 | 200 |
| Polymerizable Unsaturated Monomer (C) | Methyl methacrylate |  | 5 | 4 | 3 | 3 | 4 | 4 |
|  | Ethyl acrylate |  |  |  |  |  |  |  |
|  | Methacrylic acid |  |  |  |  |  |  |  |
|  | Dimethylaminoethyl methacrylate |  |  |  |  |  |  | 2 |
|  | t-butylacrylamide sulfonic acid |  | 1.6 |  | 1 | 2 | 2 |  |
|  | 2-methacryloyloxyethyl acid phosphate |  |  |  |  |  |  |  |
|  | Ethylene glycol dimethacrylate |  | 5 | 4 | 2 | 4 | 4 | 4 |
|  | Neopentyl glycol dimethacrylate |  |  |  |  |  |  |  |
| Added solvent | Water |  | 20 |  | 20 |  | 20 |  |
|  | Heptane |  | 200 | 200 | 200 | 100 | 100 | 200 |
|  | Isopar C |  |  |  |  |  |  |  |
| Polymerization initiator | 2,2'-azobis(2-methylbutyronitrile) |  | 2 | 2 | 2 | 2 | 2 |  |
|  | t-butylperoxy-2-ethyl benzoate |  |  |  |  |  |  | 2 |

The following abbreviations are used in Table 3.
AB-6: Macromonomer (polybutylacrylate macromonomer manufactured by Toagoasei Co., Ltd.)
Pigment 1: Fastogen Blue FGF (wet cake), C.I. Pigment Blue 15:3 (blue pigment manufactured by DIC Corporation), pigment content: 48.0%
Pigment 2: Fastogen Blue FGF (powder), C.I. Pigment Blue 15:3 (blue pigment manufactured by DIC Corporation)
Pigment 3: Symuler Fast Red 4590 (powder), C.I. Pigment Red 146 (red pigment manufactured by DIC Corporation)
Pigment 4: Fastogen Green S (wet cake), C.I. Pigment Green 7 (green pigment manufactured by DIC Corporation), pigment content: 46%
Pigment 5: Fastogen Green 2YK (powder), C.I. Pigment Green 36 (green pigment manufactured by DIC Corporation)
Pigment 6: Symuler Fast Yellow 4400T (powder), C.I. Pigment Yellow 14 (yellow pigment manufactured by DIC Corporation)
Pigment 7: Tipaque CR-93 (powder), titanium oxide (rutile titanium oxide pigment manufactured by Ishihara Sangyo Kaisha Ltd.)

TABLE 4

|  |  |  | Ex. 7 | Ex. 8 | Ex. 9 | Ex. 10 | Ex. 11 |
|---|---|---|---|---|---|---|---|
| Polymer modified pigment (PM pigment) |  |  | PM pigment (7) | PM pigment (8) | PM pigment (9) | PM pigment (10) | PM pigment (11) |
| Pigment mixture | Copolymer (B-1) | Type | (B-1-4) | (B-1-5) | (B-1-6) | (B-1-7) | (B-1-1) |
|  |  | Amt. used | 20 | 30 | 30 | 30 | 50 |
|  | Non-aqueous solvent during dispersion | Heptane Isopar C | 300 | 300 | 400 | 400 | 400 |
|  | Pigment (A) | Type | Pigment 4 | Pigment 4 | Pigment 5 | Pigment 6 | Pigment 7 |
|  |  | Amt. used | 217.4 | 217.4 | 100.0 | 100.0 | 100.0 |
|  | 1.25 mm zirconia beads |  | 600 | 600 | 600 | 600 | 600 |
|  | Non-aqueous solvent added before removal of the beads | Heptane Isopar C | 200 | 200 | 200 | 200 | 200 |

TABLE 4-continued

|  |  | Ex. 7 | Ex. 8 | Ex. 9 | Ex. 10 | Ex. 11 |
|---|---|---|---|---|---|---|
| Polymerizable Unsaturated Monomer (C) | Methyl methacrylate | 2.5 | 6.5 |  | 4.0 | 6.5 |
|  | Ethyl acrylate |  |  | 4.0 |  |  |
|  | Methacrylic acid |  |  |  |  |  |
|  | Dimethylaminoethyl methacrylate | 1.6 |  |  | 1.6 | 2.5 |
|  | t-butylacrylamide sulfonic acid |  |  |  |  |  |
|  | 2-methacryloyloxyethyl acid phosphate | 0.8 |  |  | 0.8 |  |
|  | Ethylene glycol dimethacrylate |  | 4.5 | 4.0 |  | 4.5 |
|  | Neopentyl glycol dimethacrylate | 4.5 |  |  |  |  |
| Added solvent | Water | 20 |  |  |  |  |
|  | Heptane | 200 | 200 | 100 | 200 | 100 |
|  | Isopar C |  |  |  |  |  |
| Polymerization initiator | 2,2'-azobis(2-methylbutyronitrile) |  | 2.0 | 2.0 | 2.0 |  |
|  | t-butylperoxy-2-ethyl benzoate | 1.5 |  |  |  | 3.0 |

The following abbreviations are used in Table 4.

Pigment 1: Fastogen Blue FGF (wet cake), C.I. Pigment Blue (blue pigment manufactured by DIC Corporation), pigment content: 48.0%

Pigment 2: Fastogen Blue FGF (powder), C.I. Pigment Blue 15:3 (blue pigment manufactured by DIC Corporation)

Pigment 3: Symuler Fast Red 4590 (powder), C.I. Pigment Red 146 (red pigment manufactured by DIC Corporation)

Pigment 4: Fastogen Green S (wet cake), C.I. Pigment Green 7 (green pigment manufactured by DIC Corporation), pigment content: 46%

Pigment 5: Fastogen Green 2YK (powder), C.I. Pigment Green (green pigment manufactured by DIC Corporation)

Pigment 6: Symuler Fast Yellow 4400T (powder), C.I. Pigment Yellow 14 (yellow pigment manufactured by DIC Corporation)

Pigment 7: Tipaque CR-93 (powder), titanium oxide (rutile titanium oxide pigment manufactured by Ishihara Sangyo Kaisha Ltd.)

TABLE 5

|  |  |  | Ex. 12 | Ex. 13 | Ex. 14 | Ex. 15 | Ex. 16 |
|---|---|---|---|---|---|---|---|
| Polymer modified pigment (PM pigment) |  |  | PM pigment (12) | PM pigment (13) | PM pigment (14) | PM pigment (15) | PM pigment (16) |
| Pigment mixture | Alkyd resin (B-2) | Type | Alkyd resin 1 | (B-2-1-1) | Alkyd resin 1 | Alkyd resin 2 | (B-2-2-1) |
|  |  | Amt. used | 14.9 | 40.0 | 22.4 | 8.3 | 20.0 |
|  | Non-aqueous solvent during dispersion | Heptane | 300.0 |  |  | 300.0 | 300.0 |
|  |  | Isopar C |  | 300.0 | 300.0 |  |  |
|  | Pigment (A) | Type | Pigment 1 | Pigment 1 | Pigment 6 | Pigment 7 | Pigment 2 |
|  |  | Amt. used | 208.3 | 208.3 | 100.0 | 100.0 | 100.0 |
|  | 1.25 mm zirconia beads |  | 600 | 600 | 600 | 600 | 600 |
|  | Non-aqueous solvent added before removal of the beads | Heptane | 200.0 |  |  | 200.0 | 200.0 |
|  |  | Isopar C |  | 200.0 | 200.0 |  |  |
| Polymerizable Unsaturated Monomer (C) | Methyl methacrylate |  | 5.0 |  | 3.2 | 2.0 | 2.6 |
|  | Ethyl acrylate |  |  | 2.7 |  |  |  |
|  | Methacrylic acid |  |  | 1.1 |  |  |  |
|  | Dimethylaminoethyl methacrylate |  |  |  | 3.2 |  | 1.9 |
|  | t-butylacrylamide sulfonic acid |  |  | 1.6 |  |  |  |
|  | 2-methacryloyloxyethyl acid phosphate |  |  |  |  | 0.6 |  |
|  | Ethylene glycol dimethacrylate |  | 3.0 | 1.6 | 2.6 | 1.3 |  |
|  | Neopentyl glycol dimethacrylate |  |  |  |  |  | 1.9 |

TABLE 5-continued

| | | Ex. 12 | Ex. 13 | Ex. 14 | Ex. 15 | Ex. 16 |
|---|---|---|---|---|---|---|
| Added solvent | Water | 20.0 | | | | |
| | Heptane | 200.0 | | | 200.0 | 200.0 |
| | Isopar C | | 200.0 | 200.0 | | |
| Polymerization initiator | 2,2'-azobis(2-methylbutyronitrile) | 2.0 | | | 0.7 | 1.5 |
| | t-butylperoxy-2-ethyl hexanoate | | 1.8 | 2.0 | | |

The following abbreviations are used in Table 5.

Pigment 1: Fastogen Blue FGF (wet cake), C.I. Pigment Blue (blue pigment manufactured by DIC Corporation), pigment content: 48.0%

Pigment 2: Fastogen Blue FGF (powder), C.I. Pigment Blue 15:3 (blue pigment manufactured by DIC Corporation)

Pigment 3: Symuler Fast Red 4590 (powder), C.I. Pigment Red 146 (red pigment manufactured by DIC Corporation)

Pigment 4: Fastogen Green S (wet cake), C.I. Pigment Green 7 (green pigment manufactured by DIC Corporation), pigment content: 46%

Pigment 5: Fastogen Green 2YK (powder), C.I. Pigment Green 36 (green pigment manufactured by DIC Corporation)

Pigment 6: Symuler Fast Yellow 4400T (powder), C.I. Pigment Yellow 14 (yellow pigment manufactured by DIC Corporation)

Pigment 7: Tipaque CR-93 (powder), titanium oxide (rutile titanium oxide pigment manufactured by Ishihara Sangyo Kaisha Ltd.)

Alkyd resin 1: Beckosol P-470-67B (soybean oil-based alkyd resin manufactured by DIC Corporation, non-volatile matter content: 67%, solvent: "LAWS" (Shell Chemicals)

Alkyd resin 2: Super Beckosol J-537: Safflower oil-based alkyd resin manufactured by DIC Corporation, non-volatile matter content: 60%, solvent: "LAWS" (Shell Chemicals)

TABLE 6

| | | | Ex. 17 | Ex. 18 | Ex. 19 | Ex. 20 | Ex. 21 |
|---|---|---|---|---|---|---|---|
| Polymer modified pigment (PM pigment) | | | PM pigment (17) | PM pigment (18) | PM pigment (19) | PM pigment (20) | PM pigment (21) |
| Pigment mixture | Alkyd resin (B-2) | Type | (B-2-2-2) | (3-2-2-3) | (B-2-2-4) | Alkyd resin 1/ (B-2-2-2) | Alkyd resin 1/ (B-2-2-3) |
| | | Amt. used | 60.0 | 40.0 | 40.0 | 10.0/ 15.0 | 15.0/ 30.0 |
| | Non-aqueous solvent during dispersion | Heptane | 300.0 | | 300.0 | 300.0 | |
| | | Isopar C | | 300.0 | | | 300.0 |
| | Pigment (A) | Type | Pigment 3 | Pigment 4 | Pigment 4 | Pigment 2 | Pigment 4 |
| | | Amt. used | 100.0 | 217.4 | 217.4 | 100.0 | 217.4 |
| | 1.25 mm zirconia beads | | 600 | 600 | 600 | 600 | 600 |
| | Non-aqueous solvent added before removal of the beads | Heptane | 200.0 | | 200.0 | 200.0 | |
| | | Isopar C | | 200.0 | | | 200.0 |
| Polymerizable Unsaturated Monomer (C) | Methyl methacrylate | | 3.0 | 4.2 | 3.7 | 3.2 | 5.2 |
| | Ethyl acrylate | | | | | | |
| | Methacrylic acid | | | | | | 1.6 |
| | Dimethylaminoethyl methacrylate | | | 1.1 | 1.6 | | |
| | t-butylacrylamide sulfonic acid | | 1.2 | | | 1.3 | |
| | 2-methacryloyloxyethyl acid phosphate | | | 0.5 | | | |
| | Ethylene glycol dimethacrylate | | 1.8 | 2.1 | 2.6 | | 3.6 |
| | Neopentyl glycol dimethacrylate | | | | | 1.9 | |
| Added solvent | Water | | 20.0 | | | 20.0 | |
| | Heptane | | 200.0 | | | 200.0 | |
| | Isopar C | | | | | | |

TABLE 6-continued

Table 6

|  |  | Ex. 17 | Ex. 18 | Ex. 19 | Ex. 20 | Ex. 21 |
|---|---|---|---|---|---|---|
| Polymerization initiator | 2,2'-azobis(2-methylbutyronitrile) | 1.0 | 2.0 | 2.0 | 1.5 | 2.0 |
|  | t-butylperoxy-2-ethyl hexanoate |  |  |  |  | 1.0 |

The following abbreviations are used in Table 6.

Pigment 1: Fastogen Blue FGF (wet cake), C.I. Pigment Blue 15:3 (blue pigment manufactured by DIC Corporation), pigment content: 48.0%

Pigment 2: Fastogen Blue FGF (powder), C.I. Pigment Blue 15:3 (blue pigment manufactured by DIC Corporation)

Pigment 3: Symuler Fast Red 4590 (powder), C.I. Pigment Red 146 (red pigment manufactured by DIC Corporation)

Pigment 4: Fastogen Green S (wet cake), C.I. Pigment Green 7 (green pigment manufactured by DIC Corporation), pigment content: 46%

Pigment 5: Fastogen Green 2YK (powder), C.I. Pigment Green 36 (green pigment manufactured by DIC Corporation)

Pigment 6: Symuler Fast Yellow 4400T (powder), C.I. Pigment Yellow 14 (yellow pigment manufactured by DIC Corporation.)

Pigment 7: Tipaque CR-93 (powder), titanium oxide (rutile titanium oxide pigment manufactured by Ishihara Sangyo Kaisha Ltd.)

Alkyd resin 1: Beckosol P-470-67B (soybean oil-based alkyd resin manufactured by DIC Corporation., non-volatile matter content: 67%, solvent: "LAWS" (Shell Chemicals)

Alkyd resin 2: Super Beckosol J-537: Safflower oil-based alkyd resin manufactured by DIC Corporation, non-volatile matter content: 60%, solvent: "LAWS" (Shell Chemicals)

Comparative Example 1

100 parts of a powder of Fastogen Blue FGF (blue pigment manufactured by DIC Corporation, pigment content: 100%), 20 parts of the graft copolymer obtained in Comparative Reference Example 1, 600 parts of 1.25 mm zirconia beads and 400 parts of heptane were placed in a polyethylene wide-mouthed bottle and mixed for 60 minutes with a paint shaker (Toyo Seiki Co., Ltd.). After diluting with 200 parts of heptane, the zirconia beads were removed. 400 parts of the resulting pigment mixture and 200 parts of heptane were placed in a separable flask provided with a thermometer, stirrer, reflux condenser and nitrogen gas inlet tube followed by addition of a solution of 2 parts of 2,2'-azobis(2-methylbutyronitrile) dissolved in 8 parts of methyl methacrylate while stirring. After continuing to stir for 30 minutes at room temperature, the temperature was raised to 80° C. and the reaction was continued for 15 hours at the same temperature. After cooling, filtration was carried out to obtain a polymer modified pigment (H1). Filtration required considerable time due to clogging of the filter paper. In addition, a large amount of polymer component was observed to precipitate in the filtrate.

Comparative Example 2

100 parts of a powder of Fastogen Green 2YK (green pigment manufactured by DIC Corporation, pigment content: 100%), 30 parts of the butyl acrylate homopolymer obtained in Comparative Reference Example 2, 600 parts of 1.25 mm zirconia beads and 400 parts of heptane were placed in a polyethylene wide-mouthed bottle and mixed for 60 minutes with a paint shaker (Toyo Seiki Co., Ltd.). After diluting with 200 parts of heptane, the zirconia beads were removed. 400 parts of the resulting pigment mixture and 200 parts of heptane were placed in a separable flask provided with a thermometer, stirrer, reflux condenser and nitrogen gas inlet tube followed by addition of a solution of 2 parts of 2,2'-azobis(2-methylbutyronitrile) dissolved in 4 parts of ethylene glycol dimethacrylate while stirring. After continuing to stir for 30 minutes at room temperature, the temperature was raised to 80° C. and the reaction was continued for 15 hours at the same temperature. After cooling, filtration was carried out to obtain a polymer modified pigment (H2). Filtration required considerable time due to clogging of the filter paper. In addition, a large amount of polymer component was observed to precipitate in the filtrate.

Application Example 1

A solution of 5 parts of the polymer modified pigment (1) obtained in Example 1 and 2.1 parts of "Ajisper PB-821" (pigment dispersant manufactured by Ajinomoto Fine-Techno Co., Inc.) dissolved in 21.4 parts of ethyl acetate and 125 parts of 1.25 mm zirconia beads were placed in a polyethylene wide-mouthed bottle and dispersed for 2 hours with a paint shaker (Toyo Seiki Co., Ltd.). After adding 7.1 parts of ethyl acetate and removing the zirconia beads, the dispersion was coated onto a glass plate with a bar coater no. 6. After allowing to dry for 10 hours at room temperature, the result of measuring 60-degree gloss with haze gloss meter (BYK Gardner) was 95. In addition, the result of measuring cyan density (OD value) with SpectroEye (Gretag Macbeth) was 1.9. Moreover, the coated film exhibited satisfactory transparency and was confirmed to demonstrate satisfactory pigment dispersibility.

Application Examples 2 to 21

Pigment dispersion, coating and evaluation were carried out in the same manner as Application Example 1 with the exception of changing the polymer modified pigment (1), pigment dispersant and solvent as shown in Tables 7 and 8.

Comparative Application Examples 1 to 4

Pigment dispersion, coating and evaluation were carried out in the same manner as Application Example 1 with the exception of changing the pigment, pigment dispersant and solvent as shown in Tables 9 and 10.

TABLE 7

Table 7 Application Examples

|  |  | App. Ex. 1 | App. Ex. 2 | App. Ex. 3 | App. Ex. 4 | App. Ex. 5 | App. Ex. 6 | App. Ex. 7 |
|---|---|---|---|---|---|---|---|---|
| Composition during pigment dispersion | Type of polymer modified pigment | (1) | (2) | (3) | (4) | (5) | (6) | (7) |
|  | Amount of pigment used | 5 | 5 | 5 | 5 | 5 | 5 | 5 |
|  | Ajisper PB-821 | 2.1 | 2.1 | 2.1 |  |  | 2.1 | 2.1 |
|  | Disperbyk-2050 |  |  |  | 4.1 | 4.1 |  |  |
|  | Ethyl acetate | 21.4 | 21.4 | 21.4 | 19.5 | 19.5 | 21.4 | 21.4 |
|  | 1.25 mm zirconia beads | 125 | 125 | 125 | 125 | 125 | 125 | 125 |
| Ethyl acetate (amount of dilution solvent added before removal of the beads) |  | 7.1 | 7.1 | 7.1 | 7.1 | 7.1 | 7.1 | 7.1 |
| Evaluation results | Gloss (60°) | 95 | 90 | 92 | 109 | 105 | 95 | 88 |
|  | Transparency | Clear | Clear | Clear | Clear | Clear | Clear | Clear |
|  | OD value (cyan) | 1.9 | 1.8 | 2.0 | — | — | 1.8 | — |
|  | OD value (magenta) | — | — | — | 1.9 | 1.8 | — | — |

The following abbreviations are used in Table 7.
Ajisper PB-821: Pigment dispersant manufactured by Ajinomoto Fine-Techno Co., Inc., active ingredient content: 100%
Disperbyk-2050: Pigment dispersant manufactured by BYK-Chemie GmbH, active ingredient content: 52%

TABLE 8

Table 8 Application Examples

|  |  | App. Ex. 8 | App. Ex. 9 | App. Ex. 10 | App. Ex. 11 |
|---|---|---|---|---|---|
| Composition during pigment dispersion | Type of polymer modified pigment | (8) | (9) | (10) | (11) |
|  | Amount of pigment used | 5 | 5 | 5 | 5 |
|  | Ajisper PB-821 | 2.1 | 2.1 | 2.1 | 2.1 |
|  | Disperbyk-2050 |  |  |  |  |
|  | Ethyl acetate | 21.4 | 21.4 | 21.4 | 21.4 |
|  | 1.25 mm zirconia beads | 125 | 125 | 125 | 125 |
| Ethyl acetate (amount of dilution solvent added before removal of the beads) |  | 7.1 | 7.1 | 7.1 | 7.1 |
| Evaluation results | Gloss (60°) | 90 | 93 | 32 | 90 |
|  | Transparency | Clear | Clear | Clear | — |
|  | OD value (cyan) | — | — | — | — |
|  | OD value (magenta) | — | — | — | — |
|  | OD value (yellow) | — | — | 1.3 | — |

The following abbreviations are used in Table 8.
Ajisper PB-821: Pigment dispersant manufactured by Ajinomoto Fine-Techno co., Inc., active ingredient content: 100%
Disperbyk-2050: Pigment dispersant manufactured by BYK-Chemie GmbH, active ingredient content: 52%

TABLE 9

Table 9 Application Examples

|  |  | App. Ex. 12 | App. Ex. 13 | App. Ex. 14 | App. Ex. 15 | App. Ex. 16 | App. Ex. 17 | App. Ex. 18 |
|---|---|---|---|---|---|---|---|---|
| Composition during pigment dispersion | Type of polymer modified pigment | (12) | (13) | (14) | (15) | (16) | (17) | (18) |
|  | Amount of pigment used | 5 | 5 | 5 | 5 | 5 | 5 | 5 |

TABLE 9-continued

Table 9 Application Examples

|  |  | App. Ex. 12 | App. Ex. 13 | App. Ex. 14 | App. Ex. 15 | App. Ex. 16 | App. Ex. 17 | App. Ex. 18 |
|---|---|---|---|---|---|---|---|---|
|  | Ajisper PB-821 | 2.1 | 2.1 | 2.1 | 2.1 | 2.1 |  |  |
|  | Disperbyk-2050 |  |  |  |  |  | 4.1 | 4.1 |
|  | Ethyl acetate | 21.4 | 21.4 | 21.4 | 21.4 | 21.4 | 19.5 | 19.5 |
|  | 1.25 mm zirconia beads | 125 | 125 | 125 | 125 | 125 | 125 | 125 |
| Ethyl acetate (amount of dilution solvent added before removal of the beads) |  | 7.1 | 7.1 | 7.1 | 7.1 | 7.1 | 7.1 | 7.1 |
| Evaluation results of the coating | Gloss (60°) | 90 | 88 | 35 | 95 | 91 | 92 | 95 |
|  | Transparency | Clear | Clear | Clear | — | Clear | Clear | Clear |
|  | OD value (cyan) | 1.8 | 2.0 | — | — | 1.9 | — | — |
|  | OD value (magenta) | — | — | — | — | — | 1.9 | — |
|  | OD value (yellow) | — | — | 1.5 | — | — | — | — |

The following abbreviations are used in Table 9.
Ajisper PB-821: Pigment dispersant manufactured by Ajinomoto Fine-techno Co., Inc., active ingredient content: 100%
Disperbyk-2050: Pigment dispersant manufactured by BYK-Chemie GmbH, active ingredient content: 52%

TABLE 10

Table 10 Application Examples

|  |  | App. Ex. 19 | App. Ex. 20 | App. Ex. 21 | Comp. App. Ex. 1 | Comp. App. Ex. 2 | Comp. App. Ex. 3 | Comp. App. Ex. 4 |
|---|---|---|---|---|---|---|---|---|
| Composition during pigment dispersion | Type of polymer modified pigment | (19) | (20) | (21) | (H1) | (H2) | X1 | X2 |
|  | Amount of pigment used | 5 | 5 | 5 | 5 | 5 | 5 | 5 |
|  | Ajisper PB-821 |  | 2.1 | 2.1 | 2.1 | 2.1 | 2.1 | 2.1 |
|  | Disperbyk-2050 | 4.1 |  |  |  |  |  |  |
|  | Ethyl acetate | 19.5 | 21.4 | 21.4 | 21.4 | 21.4 | 21.4 | 21.4 |
|  | 1.25 mm zirconia beads | 125 | 125 | 125 | 125 | 125 | 126 | 127 |
| Ethyl acetate (amount of dilution solvent added before removal of the beads) |  | 7.1 | 7.1 | 7.1 | 7.1 | 7.1 | 7.1 | 7.1 |
| Evaluation results | Gloss (60°) | 93 | 89 | 93 | 58 | 77 | 70 | 6 |
|  | Transparency | Clear | Clear | Clear | Opaque | Opaque | Opaque | Opaque |
|  | OD value (cyan) | — | 1.8 | — | 1.6 | — | — | — |
|  | OD value (magenta) | — | — | — | — | — | — | — |
|  | OD value (yellow) | — | — | — | — | — | — | 1.1 |

The following abbreviations are used in Table 10.

Ajisper PB-821: Pigment dispersant manufactured by Ajinomoto Fine-Techno Co., Inc., active ingredient content: 100%

Disperbyk-2050: Pigment dispersant manufactured by BYK-Chemie GmbH, active ingredient content: 52%

X1: Fastogen Green 2YK, C.I. Pigment Green 36 (green pigment manufactured by DIC Corporation)

X2: Symuler Fast Yellow 4400T, C.I. Pigment Yellow 14 (yellow pigment manufactured by DIC Corporation)

Coated films using the polymer modified pigments (1) to (21) obtained in Examples 1 to 21 imparted extremely high gloss values of 85 or more and had superior transparency (although gloss values in Application Examples 10 and 14, which were 35, are lower than other application examples, this is due to the low gloss value of the "Symuler Fast Yellow 4400T" pigment used, and these gloss values can be seen to still be higher than that of Comparative Application Example 4). These results indicate superior dispersibility. Coated films using the polymer modified pigments (H1) and (H2) obtained in Comparative Examples 1 and 2 demonstrated low gloss values and inferior transparency. These results indicate poor dispersibility.

While preferred embodiments of the invention have been described and illustrated above, it should be understood that these are exemplary of the invention and are not to be considered as limiting. Additions, omissions, substitutions and other modifications can be made without departing from the spirit or scope of the present invention. Accordingly, the invention is not to be considered as being limited by the foregoing description, and is only limited by the scope of the appended claims.

INDUSTRIAL APPLICABILITY

The polymer modified pigment of the present invention can be used as a colorant of paints, plastics, printing ink, rubber, leather, textile printing, color filters, ink jet ink or thermal transfer ink and the like.

What is claimed is:

1. A polymer modified pigment particle having a polymer (P-1) on the surface of a pigment (A), wherein
the polymer (P-1) is obtained by copolymerizing in a non-aqueous solvent, a copolymer (B-1) and at least one kind of polymerizable unsaturated monomer (C); and
the copolymer (B-1) comprises at least one polymerizable unsaturated group, is obtained by polymerization of a polymerizable unsaturated monomer, and is soluble in a non-aqueous solvent; and
at least one kind of polymerizable unsaturated monomer (C) is soluble in the non-aqueous solvent and either insoluble or poorly soluble following polymerization, and includes a polyfunctional polymerizable unsaturated monomer.

2. The polymer modified pigment particle according to claim 1, wherein the non-aqueous solvent contains an aliphatic hydrocarbon-based solvent and/or an alicyclic hydrocarbon-based solvent.

3. A process for producing the polymer modified pigment particle according to claim 1, comprising:
mixing a pigment (A), a copolymer (B-1) and a non-aqueous solvent;
wherein the copolymer (B-1) comprises at least one polymerizable unsaturated group, is obtained by polymerization of a polymerizable unsaturated monomer, and is soluble in a non-aqueous solvent;
copolymerizing in the non-aqueous solvent, the copolymer (B-1) and at least one kind of polymerizable unsaturated monomer (C) to form a polymer (P-1);
wherein at least one kind of polymerizable unsaturated monomer (C) is soluble in the non-aqueous solvent and either insoluble or poorly soluble following polymerization, and includes a polyfunctional polymerizable unsaturated monomer; and
obtaining the polymer modified pigment particle having the polymer (P-1) on the surface of the pigment (A).

4. The process for producing a polymer modified pigment particle according to claim 3, wherein the non-aqueous solvent contains an aliphatic hydrocarbon-based solvent and/or an alicyclic hydrocarbon-based solvent.

5. The polymer modified pigment particle according to claim 1, wherein the polyfunctional polymerizable unsaturated monomer included in the polymerizable unsaturated monomer (C) is at least one selected from the group consisting of divinyl benzene, ethylene glycol di(meth)acrylate, diethylene glycol di(meth)acrylate, triethyleue glycol di(meth)acrylate, polyethylene glycol di(meth)acrylate, 1,3-butanediol di(meth)acrylate, 1,4-butanediol di(meth)acrylate, 1,6-hexanediol di(meth)acrylate, neopentyl glycol dimethacrylate, trimethylolpropane triethoxy tri(meth)acrylate, trimethylolpropane tri(meth)acrylate, pentaerythritol tri(meth)acrylate, pentaerythritol tetra(meth)acrylate, dipentaerythritol hexa(meth)acrylate and allyl methacrylate.

6. The polymer modified pigment particle according to claim 1, wherein the copolymer (B-1) is: a polymer in which a polymerizable unsaturated group has been introduced into a copolymer of a polymerizable unsaturated monomer having an alkyl(meth)acrylate having an alkyl group having 4 or more carbon atoms; or a macromonomer which is a copolymer of a polymerizable unsaturated monomer having an alkyl (meth)acrylate having an alkyl group having 4 or more carbon atoms.

7. The polymer modified pigment particle according to claim 1, wherein the polymer modified pigment is a polymer modified dried pigment.

8. The polymer modified pigment particle according to claim 1, wherein the pigment is obtained by:
mixing a non-aqueous solvent, a pigment (A) and a copolymer (B-1) of a polymerizable unsaturated monomer containing at least one polymerizable unsaturated group, wherein the copolymer (B-1) is soluble in a non-aqueous solvent, to form a mixture wherein the surface of the pigment (A) is wetted with the copolymer (B-1);
adding a polymerizable unsaturated monomer (C) in the mixture to form a polymer (P-1), which is obtained by copolymerizing the polymerizable unsaturated monomer (C) and the copolymer (B-1), on the surface of the pigment (A), wherein the polymerizable unsaturated monomer (C) is soluble in the non-aqueous solvent and either insoluble or poorly soluble following polymerization and includes a polyfunctional polymerizable unsaturated monomer; and
drying the pigment (A) on which the polymer (P-1) is provided.

9. The polymer modified pigment particle according to claim 1, wherein, the polymer modified pigment particle is a powder pigment.

10. The polymer modified pigment particle according to claim 1, wherein the polymer modified pigment particle is a separated polymer modified pigment.

11. A polymer modified pigment particle having a polymer (P-1) on the surface of a pigment (A), wherein the polymer modified pigment particle is a separated dried powder pigment particle, the polymer (P-1) is obtained by copolymerizing in the non-aqueous solvent a copolymer (B-1) and at least one kind of polymerizable unsaturated monomer (C); and the copolymer (B-1) comprises at least one polymerizable unsaturated group, is obtained by polymerization of a polymerizable unsaturated monomer, and is soluble in a non-aqueous solvent; and at least one kind of polymerizable unsaturated monomer (C) is soluble in the non-aqueous solvent and either insoluble or poorly soluble following polymerization, and includes a polyfunctional polymerizable unsaturated monomer; and wherein the dried powder pigment particle is obtained by:

mixing a non-aqueous solvent, a pigment (A) and the copolymer (B-1) to form a mixture;

adding the polymerizable unsaturated monomer (C) in the mixture;

polymerizing the copolymer (B-1) and the polymerizable unsaturated monomer (C) to form the polymer (P-1) on the surface of the pigment (A); and drying the pigment (A) on which the polymer (P-1) is provided.

12. The polymer modified pigment particle according to claim 1, wherein the polymer modified pigment particle is obtained by in-situ polymerization method.

13. The polymer modified pigment particle according to claim 1, wherein a polymerization temperature used for copolymerizing the copolymer (B-1) and the polymerizable unsaturated monomer (C) is within a range of 60 to 130° C.

* * * * *